April 28, 1959  W. M. KIRK  2,883,965
ANIMAL SCRATCHING, MEDICATING AND OILING APPARATUS
Filed Dec. 3, 1957  3 Sheets-Sheet 1
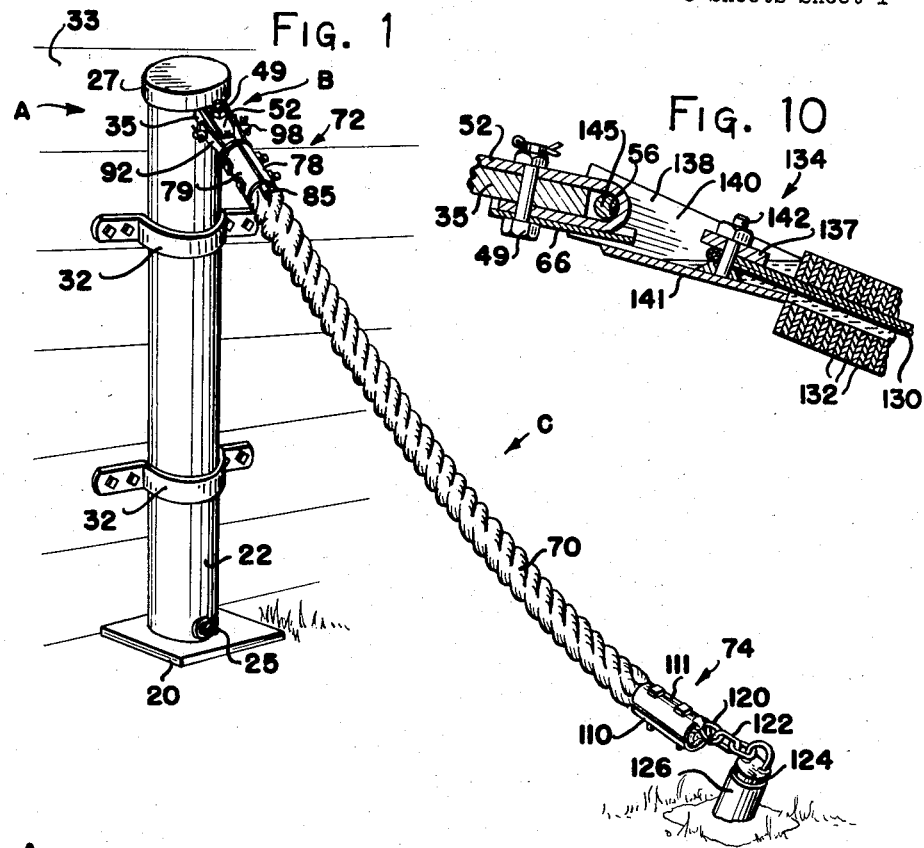
FIG. 1
FIG. 10
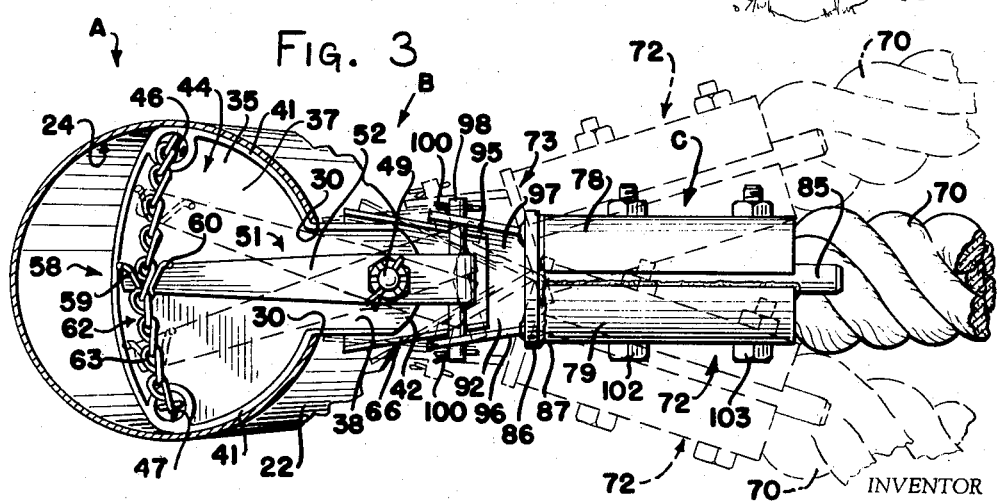
FIG. 3
INVENTOR
WILLIAM M. KIRK
BY
ATTORNEYS April 28, 1959
W. M. KIRK
2,883,965
ANIMAL SCRATCHING, MEDICATING AND OILING APPARATUS
Filed Dec. 3, 1957
3 Sheets-Sheet 2
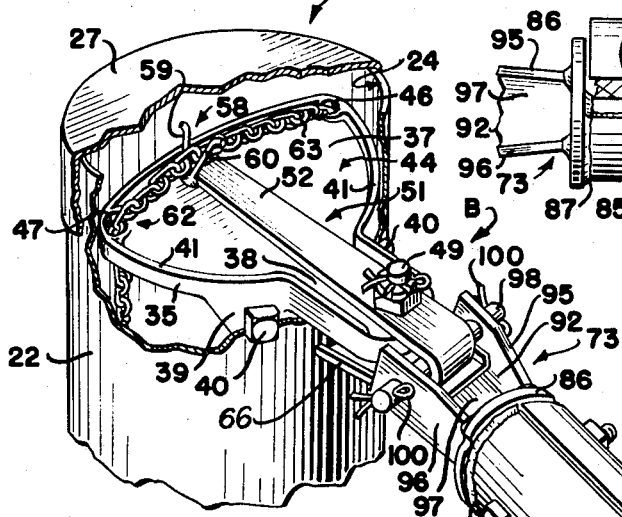
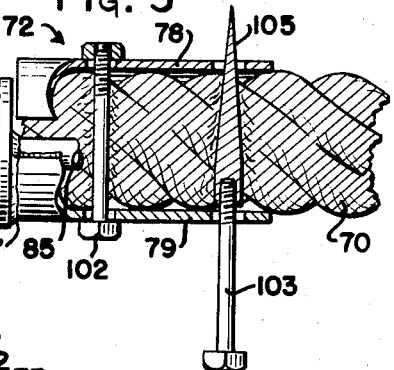
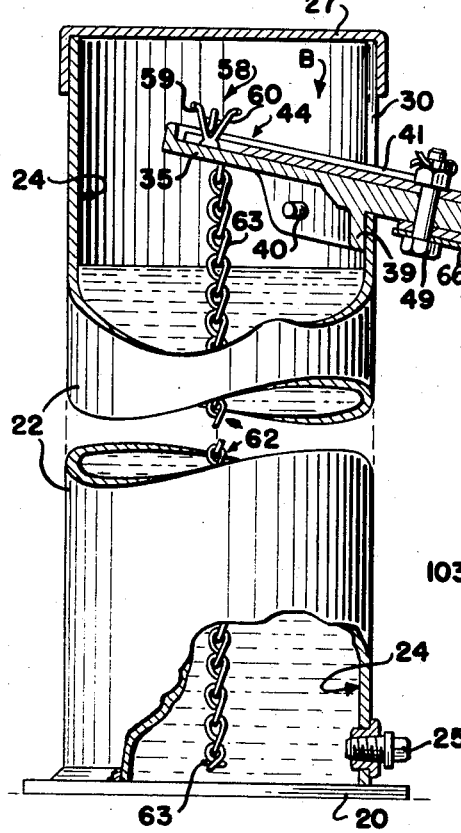
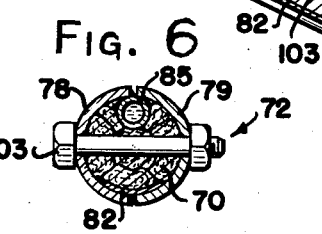
INVENTOR
WILLIAM M. KIRK
BY *Lancaster, Allwine & Rommel*
ATTORNEYS

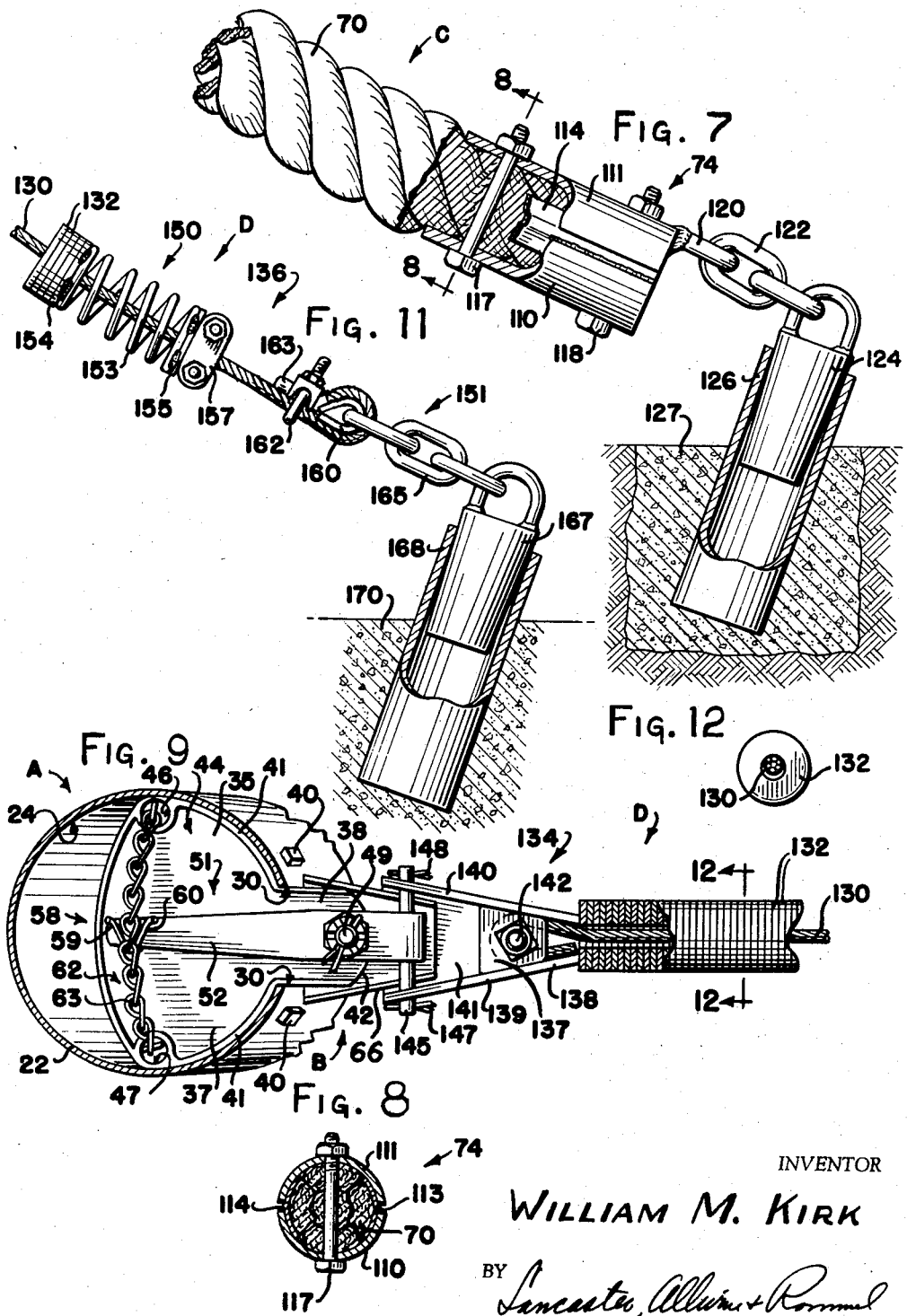

United States Patent Office 2,883,965
Patented Apr. 28, 1959

2,883,965
ANIMAL SCRATCHING, MEDICATING AND OILING APPARATUS

William M. Kirk, Amarillo, Tex.

Application December 3, 1957, Serial No. 700,434

9 Claims. (Cl. 119—157)

This invention relates to improvements in animal scratching, medicating and oiling apparatus. More particularly this invention relates to apparatus such as disclosed in Patent No. 2,581,028, issued to me January 1, 1952, of the type in which a liquid such as an oil, insecticide, or medicant is supplied to an elongated applicator against which animals may rub, thereby impregnating or coating the skin, hide, hair, bristles or fur of the animal with the liquid medium being fed to the applicator.

The primary object of this invention is the provision of improved animal scratching, medicating, and oiling apparatus having a liquid reservoir, an applicator depending from said reservoir, and fluid feeding means for feeding the fluid from the reservoir onto the applicator, wherein said feeding means is operated solely by the rubbing of the animal against the applicator, thus preventing any waste of the liquid medium when the apparatus is not actually being used by an animal.

A further object is the provision of feeding means for an animal scratching, medicating and oiling apparatus, for the transfer of a liquid medium from a reservoir to an applicator, wherein said feeding means supplies the liquid medium to the applicator without the use of any pumps, valves, or other complicated mechanism that is likely to become inoperative due to the extremely rough usage to which this apparatus will be put.

A further object is the provision of improved motion transmitting means for converting transverse reciprocatory motion, of the applicator, caused by the rubbing of the animal therealong, into rotary movement of endless conveying means for feeding the liquid medium onto the applicator as the applicator is rubbed against by the animal.

A further object is the provision of improved attaching means for securing the applicator portions to other parts of the animal scratching, medicating and oiling apparatus.

Other objects and advantages will be apparent during the course of the following detailed description of the invention, taken in connection with the accompanying drawings, forming a part of this specification and in which drawings:

Fig. 1 is a perspective view of my improved animal scratching, medicating and oiling apparatus.

Fig. 2 is an enlarged fragmentary perspective view, partly in section, of the apparatus.

Fig. 3 is a view partly in plan and partly in transverse section through the upper portion of the apparatus.

Fig. 4 is a fragmentary view, partly in elevation and partly in section, of the apparatus.

Fig. 5 is an enlarged fragmentary view, partly in plan and partly in section, of improved applicator clamping means in the course of assembly.

Fig. 6 is a transverse sectional view taken substantially on the line 6—6 of Fig. 2.

Fig. 7 is an enlarged fragmentary view, partly in elevation and partly in section, of the ground attaching and clamping portion of the apparatus.

Fig. 8 is a transverse sectional view taken substantially on the line 8—8 of Fig. 7.

Fig. 9 is a transverse sectional view, similar to Fig. 3, showing a different form of applicator.

Fig. 10 is a fragmentary, vertical sectional view of the apparatus of Fig. 9.

Fig. 11 is an enlarged fragmentary elevational view, partly in section, of the ground attaching portion of the apparatus of Fig. 9.

Fig. 12 is a transverse sectional view taken substantially on the line 12—12 of Fig. 9.

In the drawings, wherein for the purpose of illustration are shown preferred and modified forms of the invention, and wherein similar reference characters designate corresponding parts throughout the several views, the letter A designates a liquid reservoir or container for a liquid medium such as oil, insecticide, or other medicant; B liquid feeding means for feeding the liquid contained in the liquid reservoir A to an applicator means C shown in Fig. 1, or to a modified applicator means D, shown in Figs. 9–11.

The liquid reservoir or container A may generally comprise a base plate or frame 20, which is designed to form a secure base for the apparatus and also acts as the bottom of the reservoir. Secured to the plate 20 is an upstanding cylindrical casing 22, defining a chamber 24 therein which receives the liquid medium. The lowermost portion of the casing 22 may be provided with a drainage plug 25 for the draining of the liquid from within the chamber 24. A removable cap or cover 27 may be provided over the uppermost portion of the casing 22, to keep rain and dirt from entering the chamber 24. A slot or opening 30 is provided adjacent the uppermost portion of the casing 22 for receiving the feeding means B, as will be subsequently described.

In the event it is desired to support the apparatus against the side of a barn, or other building, as shown in Fig. 1, supporting straps 32 may be placed about the casing 22 and the apparatus thus secured to the side of the barn or building 33.

The feeding means B generally comprises a plate 35 having an enlarged portion 37 disposed within the chamber 24 and a reduced portion 38, extending exteriorly of the casing 22. The enlarged portion 37, along its sides, is substantially of the same diameter as the casing 22 but does not completely encircle the interior of the chamber 24, so that liquid may be poured into the casing 22 without passing over the plate 35. The reduced portion 38 of the plate 35 is adapted to extend for a short distance through the slot 30 outwardly of the casing 22. An arcuate flange 39, having an arc substantially equivalent to that of the interior of the casing 22, depends downwardly, at a slight angle from the plate 35. The plate 35 is secured to the casing 22 by suitable bolts 40 secured to the flange 39.

A flange 41 is provided about the enlarged portion 37 of the plate 35 and extends downwardly along the sides of the reduced portion 38, terminating at the end of the reduced portion 38, and having an opening 42 at one end thereof, providing means 44 for conveying liquid from the feeding means to the applicator means. Openings 46 and 47 are provided within the plate 35, for a purpose to be subsequently described. The plate 35 is disposed at a slight angle from the horizontal so that any liquid deposited on the plate 35 will flow toward the opening 42.

Pivotally secured to the plate 35, as by the nut and bolt 49, is lever means 51. The lever means 51 generally comprises a bar or rod 52 positioned upon the means 44, extending through the opening 42 and terminating short of the flange 41. The bar or rod 52 is looped from the upper side of the plate 35 to the lower side of the plate 35, as shown in Fig. 4, defining a loop 56, as shown in Fig. 4, and is then pivotally attached to the underside of the plate 35 by the nut and bolt 49.

Secured adjacent the inner end of the bar or rod 52 within the means 44, is gripping means 58. The gripping means 58 generally comprises a substantially V-shaped fork having tines 59 and 60 angularly disposed with respect to each other and mounted at an angle upon the lever 52, the operation of which will be subsequently described.

An endless conveying means 62 is provided which passes through the openings 46 and 47 in the plate 35, across and through the gripping means 58 and extends downwardly into the chamber 24 to substantially the bottom thereof, as shown in Fig. 4. The endless conveying means 62 is preferably a link chain 63 having alternating links thereof disposed in substantially normal positions to each other.

As the gripping means 58 is angularly disposed with respect to the lever 52, it will be seen that as the lever is pivoted in the direction having the greatest angle that the endless conveying means 62 will ride upwardly along the tines 59 and 60 and remain substantially motionless; and that when the lever 52 is moved in the opposite direction that the endless conveying means 62 will be directed downwardly between the tines 59 and 60, being held therebetween, and that as the motion of the lever 52 is continued a portion of the endless conveying means 62 will be rotated from within the liquid medium contained within the chamber 24 upwardly and across the plate 35. Thus the cooperation of the means 51 and 58 forms motion converting means converting the reciprocatory motion of the lever 52 into rotary motion of the means 62. The movement of the conveying mechanism 62 across the plate 35 will result in depositing globules of oil, insecticide, or other medicant, that have collected on the conveying means 62 while it was in the liquid medium, upon the conveying means 44 and these globules will flow along the plate 35 and out of the opening 42. As this liquid medium must flow past the bolt 49, which acts as the pivotal point for the lever 52 it will be seen that this pivot is thereby self-lubricating.

A short gutter or trough 66 may be secured beneath the plate 35, extending outwardly beyond the outermost end of the plate 35, extending into the receiving chamber of the applicator means C, and providing a more efficient transfer for the liquid medium from the feeding means to the applicator means.

The applicator means C may generally comprise an elongated flexible member 70, having at its upper end thereof clamping means 72 for securing the applicator means to the feeding means, including a liquid conveying means 73. The lowermost end of the elongated flexible member 70 may be provided with clamping and ground attaching means 74. The member 70 forms a rubbing portion against which the animal rubs. In Figs. 1-8 inclusive I have shown this portion as being a relatively thick fibrous member, such as rope, while in Figs. 9-12 I have shown the utilization of a plurality of discs, such as washers, supported on a cable, as forming this rubbing portion.

The upper clamping means 72 generally comprises a ferrule having two side pieces 78 and 79. Secured to the side piece 79, exteriorly thereof, is a plate 82 which extends for substantially the entire length of the side piece 79 and is adapted to overlap a portion of the interior of the side piece 78, so that when the two pieces 78 and 79 are secured together the plate 82 will ride along the interior of the side piece 78, preventing the member 70 from falling between the two halves 78 and 79 with the resultant pinching of the member 70 therebetween. Secured to the plate 79, opposite the plate 82, is a pipe 85, which extends longitudinally outwardly beyond the ends of the plate 79. This pipe 85 serves a dual purpose, on the one hand as a means for conveying the liquid medium through the clamping means 72 and on the other hand as means for preventing the pinching of the member 70 between the two halves 78 and 79, in much the same manner as the plate 82. The side piece 79 is secured to a backing plate 86, as shown in Fig. 4, as by welds 87. The ferrule half 78 is not secured to the plate 86 and is free to move with respect to the plate 86 and ferrule half 79, into a position as shown in Fig. 5, for receiving the member 70. The side pieces 78 and 79 may be held together as by nut and bolt units 102 and 103.

An opening 88 is provided at the uppermost portion of the plate 86 through which the pipe 85 extends. A substantially U-shaped bracket member 92 is secured to the opposite side of the plate from the side piece 79, immediately below the opening 88, and extends outwardly from the plate 86 for a short distance, defining a passageway for the flow of the liquid medium between the sides 95 and 96 along the base 97 of the U-shaped member 92. A bar 98 extends across the U-shaped passageway 92, through the sides 95 and 96 of the U-shaped passageway 92, and through the loop 56 provided in the lever 52. This bar 98 may be secured in place as by cotter pins 100. It will thus be seen that as the member 70 is transversely oscillated from side to side by an animal rubbing thereagainst that the lever 52 will be moved in a corresponding side to side motion, through the attachment of the bar 98 through the loop 56 of the lever 52, and the liquid medium will be fed by the conveying means 62, onto the plate 35, from whence it will flow downwardly through the opening 42, into the bracket 92, through the pipe 85 and be deposited upon the member 70.

In attaching the upper clamping means 72, as shown in Fig. 5, the bolts 102 and 103 may be fed through the member 70 by means of a needle-shaped cone 105 which may be slipped over the blunt end of the bolt, thus facilitating the passage of the bolt through the member 70. The bolt is then secured to the nut and the two halves 78 and 79 drawn together by the bolt arrangement, clamping the member 70 therebetween. It will be seen from Fig. 5 that when the member 70 is originally placed between the two halves 78 and 79 it is of a substantially larger diameter than the diameter of the two halves 78 and 79 and that when the two halves 78 and 79 are drawn together the diameter of the member 70 will be substantially reduced and the member 70 securely clamped therebetween, the end of the pipe 85 being slightly imbedded in the member 70, as shown in Fig. 4, assuring saturation of the member 70 and preventing the liquid medium from draining off the side of the member 70.

The lower clamping and ground attaching means 74 may generally comprise a ferrule having two side pieces 110 and 111. Secured to the side piece 110, interiorly thereof, are the plates 113 and 114 which extend for substantially the entire length of the side piece 110 and are adapted to overlap a portion of the interior of the side piece 111, so that when the two side pieces 110 and 111 are secured together the plates 113 and 114 will ride along the interior of the side piece 111, preventing the member 70 from falling between the two halves 110 and 111, with the resultant pinching of the member 70 therebetween. The two side pieces 110 and 111 may be secured together by means of the nut and bolt units 117 and 118. A cone shaped needle 105, such as is shown in Fig. 5 being utilized for the insertion of the bolt 103 through the member 70, may be also utilized in the insertion of the bolts 117 and 118 through the member 70. A ring or bracket 120 is welded or otherwise secured to the ferrule piece 111, at one end thereof, to which may be attached a short length of chain 122 secured to an anchor plug 124 which may be inserted within a holder or anchor pipe 126 angularly set in the ground and secured therein as by concrete 127. The plug 124 is shown in Fig. 7 as being tapered, however, in reality it may be any form of rod or bar having a slightly less diameter than the internal diameter of the pipe 126, both the plug 124 and the pipe 126 being of a sufficient length so that the plug 124 will not be lifted from within the pipe 126 by animals rubbing against the under side of the member 70.

It will be seen from Fig. 1 that the ground attaching means 74 is located at a distance from the casing 22 with the member 70 catenated therebetween, forming an elongated portion against which an animal may rub. It is of course possible to tautly stretch the member 70 between the casing 22 and the ground attaching means 74, however, I have found that optimum results are obtained when the member 70 is catenated slightly.

In the drawings, I have shown but a single feeding means and applicator means extending from the liquid reservoir, however it is obvious that two or more feeding means and applicator means may be utilized upon a single reservoir, depending upon the size of the reservoir used.

It is also obvious that it is not necessary that the reservoir be secured to the side of the barn or other building, but the base 20 may be substantially enlarged so that the reservoir may stand by itself, or that a single base may be provided for extending outwardly to and supporting the ground attaching means 74, as is disclosed in the aforesaid Patent No. 2,581,028.

Referring now to Figs. 9–12, the liquid reservoir and feeding means employed therein may be identical to the reservoir and feeding means shown in Figs. 1–8, the only difference being in the applicator means D utilized in Figs. 9–12. As this reservoir and feeding means may be identical, similar reference characters have been applied thereto.

The modified applicator means D may generally comprise an elongated cable member 130 having disposed therealong a plurality of discs or washers 132 and having at its upper end thereof clamping means 134 for securing the applicator means D to the feeding means B and a ground attaching means 136 secured to the other end of the cable 130. The cable 130 and the discs or washers 132, disposed therealong, form an animal rubbing portion similar to the member 70 that has been previously described.

The upper clamping means 134 generally comprises a bracket 138 having two side pieces 139 and 140 and a bottom plate 141. A nut and bolt combination 142 is secured to the bottom plate 141, about which one end of the cable 130 is looped and clamped tightly to the bracket 138 by a plate 137. The side pieces 139 and 140 may be convergent toward the cable 130, providing a tapering passageway or funnel which directs the flow of liquid medium from the bottom plate 141 to the cable 130. Small quantities of the liquid medium which is received by the cable 130 will naturally flow in between various of the discs 132 to the outermost surface thereof, providing a thin liquid film upon the exterior surface of the discs or washers 132, against which the animals rub.

A bar member 145 is secured between the side members 139 and 140, passing through the loop 56 provided as a part of the lever bar or rod 52, and is secured in place as by cotter pins 147 and 148. The bar 145 performs the same function in the applicator means D as the bar 98 of the applicator means C, both acting as a means for oscillatng attachment of the applicator means to the feeding means. It will be seen from Fig. 9 that as the liquid flows from the conveying means 62 onto the plate 35, it will flow downwardly through the opening 42, into the gutter or trough 66, thence into the passageway or funnel defined by the bracket 138 and thence to the cable 130.

The ground attaching and clamping means 136 preferably comprises two parts, a disc or washer support means 150 and ground attaching means 151. The disc or washer support means 150 preferaby comprises a spring 153 having secured at each end thereof discs or washers 154 and 155 encircling the cable 130 and a clamping bracket 157, such as a U-clamp embracing the cable 130. The spring 153 is provided so that the discs or washers 132 will be resiliently held together and so that they may expand or contract according to temperature changes and they may also be pushed apart slightly by an animal rubbing thereagainst, which permits flexing of the cable 132. If this resilient means were not provided the washers would not be held in intimate contact. If gravity alone is depended upon to bring about normal engagement of the washers the liquid medium is likely to flow too freely through the spaces between the washers, or if the washers or discs 132 were securely held together the animals could not part them by rubbing against the applicator means D and thus not receive an adequate amount of the liquid medium on their hides. The clamping bracket 157 may be moved along the cable 130 depending upon number of discs or washers used and also dependent upon the degree of compression of the spring 153 desired.

The ground attaching means 151 is formed by looping the lowermost end of the cable 130 about a protective bracket or sheath 160 and folded back upon itself and secured to the main portion of the cable 130 as by a clamping bracket 162, such as a U-clamp. The end of the cable 130 may be covered as at 163 to prevent the unraveling of the cable 130. A short link of chain 165 may be secured to the loop of the cable 130, abutting against the sheath 160, which protects the cable 130 from the rubbing of the link or chain 165. The other end of the link 165 is secured to an anchor plug 167 which may be inserted within a ground support or anchor pipe 168 secured in the ground as by the cementitious material 170. The plug 167 is shown in the drawings as being in the form of a wedge driven into the pipe 168, however it is to be understood that any form of support, such as a pipe having a slightly less diameter than the pipe 168 may be slipped within the pipe 168, forming the ground support. It is only necessary to make certain that animals rubbing against the applicator means will not disengage the cable from the ground support.

Various changes may be made to the forms of the invention herein shown and described without departing from the spirit of the invention or scope of the following claims.

I claim:

1. In animal scratching, medicating and oiling apparatus, the combination of a liquid reservoir, liquid feeding means secured to said reservoir and liquid applicator means operatively connected to said feeding means; said liquid feeding means including liquid conveying means for conveying liquid from said reservoir to said applicator means, lever means pivotally mounted upon said conveying means for transverse pivotal movement across said liquid conveying means, endless conveying means supporting within said liquid reservoir and extending over said liquid conveying means, said lever means being operatively connected at one end thereof to said applicator means and having unidirectional gripping means mounted adjacent the other end thereof, said gripping means comprising a fork having divergent tines engaging said endless conveying means, said fork being angularly secured to said lever means, forming an obtuse angle and an acute angle with respect to the plane of said lever means, said tines positively gripping said endless conveying means when said lever means is pivoted in the direction of the acute angle of said fork across said first mentioned conveying means, for feeding said endless conveying means across said liquid conveying means, and disengaging from gripping cooperation with said endless conveying means when said lever means is pivoted in the direction of the obtuse angle of said fork, providing unidirectional feeding of said endless conveying means across said liquid conveying means.

2. In animal scratching, medicating and oiling apparatus, the combination of a liquid reservoir having an upper end, liquid feeding means secured to the upper end of said reservoir, and liquid applicator means operatively connected to said liquid feeding means; said liquid feeding means including liquid conveying means for conveying liquid from said reservoir to said applicator means, lever means pivotally mounted upon said conveying means, a pair of divergent unidirectional gripping means angularly disposed at one end of said lever means, articulated endless liquid conveying means supported within said liquid reservoir and in operative contact with said pair of divergent gripping means, a conduit defining a fluid passageway operatively connected to the end of said lever means opposite said pair of divergent gripping means, said applicator means being secured at one end thereof to said conduit, and at the other end thereof to a fixed support.

3. The combination as specified in claim 2 wherein said articulated endless liquid conveying means comprises an endless chain having a plurality of links and extending substantially the entire depth of said reservoir, across said liquid conveying means, and between said pair of divergent gripping means, the links of said chain having normally disposed portions for cooperation with said gripping means.

4. The combination as specified in claim 2 wherein said applicator means comprises an elongated flexible member having a plurality of discs mounted along said member, clamping means secured to one end of said flexible member operatively connecting said flexible member to said conduit, a second clamping means secured to the other end of said flexible member for securing said flexible member angularly outwardly of said liquid reservoir to said fixed support, and spring means secured to said flexible member intermediate said plurality of discs and said second mentioned clamping means for resiliently supporting said discs longitudinally of said flexible member and urging said plurality of discs toward said first mentioned clamping means.

5. The combination as specified in claim 2 wherein said applicator means comprises an elongated flexible member, clamping means secured to one end of said member operatively connecting said elongated flexible member to said conduit, liquid conveying means mounted within said clamping means for conveying liquid from said feeding means through said clamping means and onto said elongated flexible member, and clamping means secured to the other end of said elongated flexible member for securing said member in a substantially angularly disposed catenated position outwardly of said liquid reservoir to said fixed support.

6. The combination as specified in claim 2 wherein said lever means directly contacts the uppermost surface of said liquid conveying means, providing a wiping action for facilitating the feeding of liquid from said liqud conveyng means onto said applicator means.

7. The combination as specified in claim 2 wherein said fixed support comprises a tubular member affixed below the upper end of said reservoir, at an obtuse angle to said reservoir, and an elongated cylindrical member that interfits within said tubular member, said one end of said applicator means being secured to said cylindrical member.

8. A fixed support as specified in claim 7 wherein said cylindrical member comprises a wedge shaped cylinder, having the lowermost end thereof of a smaller diameter than the uppermost end thereof, the lowermost end thereof being of a diameter smaller than the opening within said tubular member and the uppermost end thereof being of a diameter larger than the opening provided within said tubular member, said tapered cylindrical member being wedged within the opening provided within said tubular member.

9. In animal scratching, medicating and oiling apparatus the combination of a casing defining a chamber, a plate secured to the uppermost portion of said casing having one portion thereof within said chamber and a portion thereof leading to exteriorly of said chamber, a lever pivotally mounted on said plate, a fork having divergent tines secured adjacent one end of said lever, said fork being upstandingly and angularly disposed with respect to said lever, an endless conveying member extending downwardly into said chamber and across said plate and lever between the tines of said fork, and applicator means secured to the other end of said lever.

References Cited in the file of this patent

UNITED STATES PATENTS

| | | |
|---|---|---|
| 1,896,705 | Geisenhoner | Feb. 7, 1933 |
| 2,348,975 | Hohwart | May 16, 1944 |
| 2,581,028 | Kirk | Jan. 1, 1952 |
| 2,765,775 | Kramer | Oct. 9, 1956 |
| 2,777,421 | Hiebert | Jan. 15, 1957 |
| 2,800,108 | Duff | July 23, 1957 |